(12) United States Patent
Agrawal et al.

(10) Patent No.: US 12,386,432 B2
(45) Date of Patent: Aug. 12, 2025

(54) ELECTRONIC SYSTEM WITH A ROLLABLE DISPLAY AND A KEYBOARD THAT ARE UTILIZED TO IMITATE A TYPEWRITER

(71) Applicant: MOTOROLA MOBILITY LLC, Wilmington, DE (US)

(72) Inventors: Amit Kumar Agrawal, Bangalore (IN); Panduranga Reddy Pailla, Nalgonda (IN); Vijayprakash Bheemsainrao, Idlur (IN)

(73) Assignee: Motorola Mobility LLC, Chicago, IL (US)

( * ) Notice: Subject to any disclaimer, the term of this patent is extended or adjusted under 35 U.S.C. 154(b) by 232 days.

(21) Appl. No.: 18/343,157

(22) Filed: Jun. 28, 2023

(65) Prior Publication Data
US 2025/0004572 A1  Jan. 2, 2025

(51) Int. Cl.
*G06F 3/02* (2006.01)
*G06F 1/16* (2006.01)
*G06F 3/0489* (2022.01)
*G09F 9/30* (2006.01)

(52) U.S. Cl.
CPC .......... *G06F 3/0227* (2013.01); *G06F 1/1601* (2013.01); *G06F 3/04897* (2013.01); *G09F 9/301* (2013.01)

(58) Field of Classification Search
None
See application file for complete search history.

(56) References Cited

U.S. PATENT DOCUMENTS

| | | | | |
|---|---|---|---|---|
| 10,452,156 B2* | 10/2019 | Kang | | G06F 3/0485 |
| 11,366,584 B2* | 6/2022 | Chung | | G06F 3/04883 |
| 11,609,660 B2* | 3/2023 | Lee | | H04M 1/72448 |
| 11,627,675 B2* | 4/2023 | Eisenberg | | H05K 5/0217 |
| | | | | 361/807 |
| 11,874,704 B2* | 1/2024 | Ma | | G06F 1/1671 |
| 11,955,037 B2* | 4/2024 | Kim | | B60K 35/10 |
| 12,002,346 B2* | 6/2024 | Kwon | | H04N 21/4858 |
| 12,026,017 B2* | 7/2024 | Kim | | G06F 3/165 |
| 2006/0034042 A1* | 2/2006 | Hisano | | G09F 9/301 |
| | | | | 361/679.04 |
| 2009/0051830 A1* | 2/2009 | Matsushita | | G06F 3/1423 |
| | | | | 361/679.05 |
| 2010/0167791 A1* | 7/2010 | Lim | | G06F 1/1624 |
| | | | | 455/566 |

(Continued)

*Primary Examiner* — Matthew Yeung
(74) *Attorney, Agent, or Firm* — Isidore PLLC

(57) ABSTRACT

An electronic device, method, and computer program product imitate a typewriter. A top horizontal row of a virtual typing sheet is presented on an upper portion of an extendable display. Keystrokes received by a text input device are monitored and corresponding characters are presented across the top horizontal row of virtual typing sheet. In response to a next line transitioning condition (e.g., reaching an end of a current row or detection of a return keystroke received via the text input device), the extendable display is triggered to upwardly extend by an increment corresponding to vertical dimensions of a line spacing and font size of the characters associated with the top horizontal row. Presentation of the virtual typing sheet and the top horizontal row at the corresponding line spacing are upwardly adjusted to insert a new lateral row for presenting keystrokes.

20 Claims, 9 Drawing Sheets

(56) References Cited

U.S. PATENT DOCUMENTS

| | | | | |
|---|---|---|---|---|
| 2013/0127918 A1* | 5/2013 | Kang | G06F 1/3265 |
| | | | 345/660 |
| 2013/0128439 A1* | 5/2013 | Walters | G06F 1/1624 |
| | | | 361/679.04 |
| 2015/0153777 A1* | 6/2015 | Liu | G06F 1/1643 |
| | | | 345/173 |
| 2017/0011714 A1* | 1/2017 | Eim | G06F 1/1677 |
| 2017/0017313 A1* | 1/2017 | Rakshit | G09G 3/035 |
| 2017/0154609 A1* | 6/2017 | Yoon | G09G 5/373 |
| 2019/0261519 A1* | 8/2019 | Park | G06F 1/1677 |
| 2019/0346954 A1* | 11/2019 | Jung | G06F 3/0416 |
| 2019/0371265 A1* | 12/2019 | Sakamoto | G09G 5/373 |
| 2020/0409645 A1* | 12/2020 | Clark | G06F 1/3265 |
| 2021/0034210 A1* | 2/2021 | Chung | G06F 3/0488 |
| 2023/0040472 A1* | 2/2023 | Kim | H04N 21/42204 |
| 2023/0266797 A1* | 8/2023 | Ma | G06F 3/04886 |
| | | | 361/679.21 |
| 2025/0106318 A1* | 3/2025 | Agrawal | H04M 1/0268 |

* cited by examiner

ELECTRONIC SYSTEM WITH A ROLLABLE DISPLAY AND A KEYBOARD THAT ARE UTILIZED TO IMITATE A TYPEWRITER

BACKGROUND

1. Technical Field

The present disclosure relates generally to electronic systems having a display and input mechanism for generating text presented on the display, and more particularly to electronic systems having the input mechanism and a display that extends and retracts to change presentation size of the display.

2. Description of the Related Art

Portable electronic communication devices, such as smartphones, tablets, and laptop devices, have become ubiquitous. People all over the world use such devices to stay connected, to retrieve and consume information, and to complete tasks, such as generation of textual, graphical, and numerical based content using integrated and/or connected input devices. These devices have been designed in various mechanical configurations. Conventionally, these electronic devices each have a rigid display disposed along a major face of the electronic device. More recently, rollable flexible displays have been introduced for smaller handheld mobile devices, such as smartphones, where the displays extend or retract via a telescoping device housing or via a sliding blade that either rolls the flexible display onto a back of the device housing or extends the flexible display from a front side of the device housing. Rollable displays are being introduced to larger electronic devices such as laptops and monitors.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
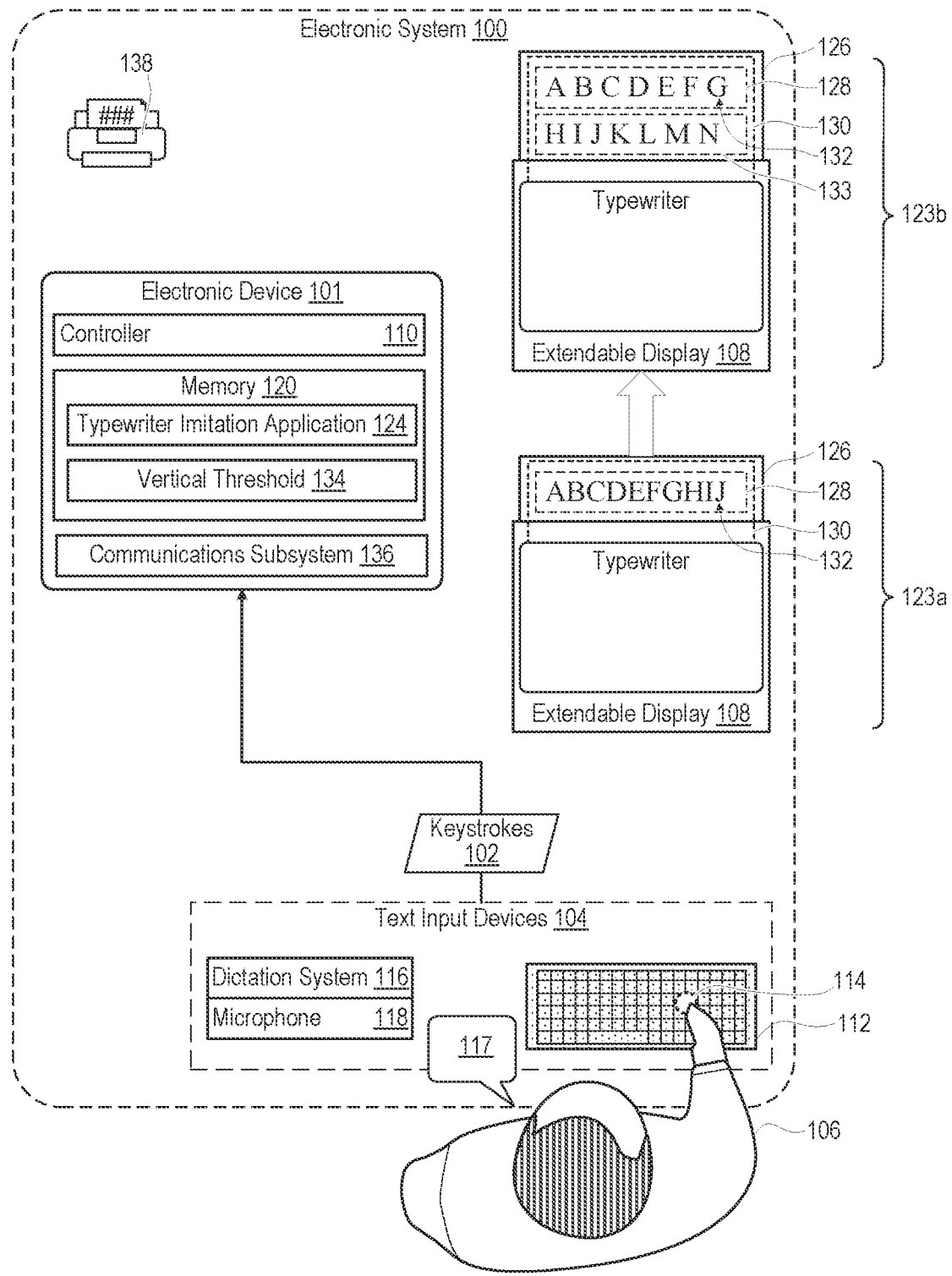
FIG. 1 presents a simplified functional block diagram of an electronic system that includes an electronic device that imitates a typewriter based on keystrokes received from a text input device and presented on an extendable display, according to the one or more embodiments.

According to aspects of the present disclosure, an electronic device, a method, and a computer program product imitate operation of a typewriter. The electronic device includes a memory that stores a typewriter imitation application. A controller of the electronic device is communicatively connected to a text input device, an extendable display, and the memory. The controller executes the typewriter imitation application, which presents, on an upper portion of the extendable display, a top horizontal row of a virtual typing sheet. The controller monitors keystrokes received by the text input device. The controller presents characters corresponding to the keystrokes across the top horizontal row of virtual typing sheet. The controller monitors occurrences of a next line transitioning condition from among a last character reaching an end of a current row of the virtual typing sheet and detection of a return keystroke received via the text input device. In response to identifying an occurrence of the next line transitioning condition, the controller triggers the extendable display to upwardly extend by an increment corresponding to vertical dimensions of a line spacing and font size of the characters associated with the top horizontal row. The controller upwardly adjusts presentation of the virtual typing sheet and the top horizontal row at the corresponding line spacing to insert a new lateral row for presenting characters corresponding to received/detected keystrokes.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 presents electronic system 100 in which electronic device 101 imitates a typewriter based on keystrokes 102 that are received from text input device 104. The keystrokes 102 originate from user 106, and the corresponding characters are presented on extendable display 108. Electronic device 101 can be one of a host of different types of devices, including but not limited to, a laptop, a netbook, an ultrabook. In an example, controller 110 of electronic device 101 monitors keystrokes 102 received by text input device 104, such as keyboard 112, as manually input 114 by user 106. In another example, controller 110 monitors keystrokes 102 provided by text input device 104 that is dictation system 116 that interprets audio input 117 spoken by user 106 and received by microphone 118. Dictation system 116 is communicatively coupled to microphone 118 to convert words and symbols recognized in audio input 117 to microphone 118 into keystrokes 102 and corresponding characters 132, such as text.

Electronic device 101 includes memory 120 that stores typewriter imitation application 122. At 123a, extendable display 108 is depicted at a first time "T0". Controller 110 executes typewriter imitation application 124, which presents, on upper portion 126 of extendable display 108, top horizontal row 128 of virtual typing sheet 130. Controller 110 presents characters 132 corresponding to keystrokes 102 across top horizontal row 128 of virtual typing sheet 130. Controller 110 monitors for an occurrence of a next line transitioning condition from among: (i) a last character reaching an end of a current row of the virtual typing sheet; and (ii) detection of a return keystroke received via text input device 104.

At 123b, extendable display 108 is depicted at a second time "T1". Controller 110 triggers the extension mechanism of extendable display 108 to upwardly extend by an increment corresponding to vertical dimensions of a line spacing and font size of characters 132 associated with top horizontal row 128. Controller 110 upwardly adjusts presentation at of virtual typing sheet 130 and top horizontal row 128 at the corresponding line spacing to insert new lateral row 133 for presenting characters 132 corresponding to received/detected keystrokes 102.

Electronic system 100 imitates a typewriter by having upper portion 126 of extendable display 108 automatically extend upwardly like a physical sheet of typing paper. Electronic system 100 resets extendable display 108 in preparation for imitating a new sheet of typing paper. Examples of extendable displays 108 are described below, such as a telescoping frame with a rollable or scrollable flexible display or an extendable blade assembly of a rollable display.

In one or more embodiments, in response to the occurrence of the next line transitioning condition, controller 110 determines whether extendable display 108 is fully extended. In response to determining that extendable display 108 is fully extended, controller 110 at least partially retracts extendable display 108. Controller 110 resets virtual typing sheet 130 by presenting, on upper portion 126 of extendable display 108, top horizontal row 128 that is empty of characters 132.

In one embodiment, in response to the occurrence of the next line transitioning condition, controller 110 determines whether the virtual typing sheet has reached vertical threshold 134 stored in memory 120. In response to determining that the virtual typing sheet has reached a vertical threshold 134, controller 110 at least partially retracts extendable display 108. Controller 110 presents, on upper portion 126 of extendable display 108, top horizontal row 128 of reset virtual typing sheet 130 that is empty of characters 132.

In one or embodiment, in response to determining at least one of that extendable display 108 is fully extended or virtual typing sheet 130 has reached vertical threshold 134, controller 110 stores virtual typing sheet 130 in memory 120 and presents an indication of storing virtual typing sheet 130 that was previously presented.

In one or more embodiments, electronic device 101 is communicatively coupled to text input device 104 and extendable display 108 of electronic system 100 via communications subsystem 136. In one or more embodiments, electronic device 101 is communicatively connectable to printing device 138 via communications subsystem 136. Controller 110 communicates virtual typing sheet 130, via communications subsystem 136, to printing device 138 to print in response to determining that virtual typing sheet 130 is complete based on at least one of: (i) identifying a new page input; (ii) determining that extendable display 108 is fully extended; and (iii) determining that virtual typing sheet 130 has reached vertical threshold 134.

Figure 2:
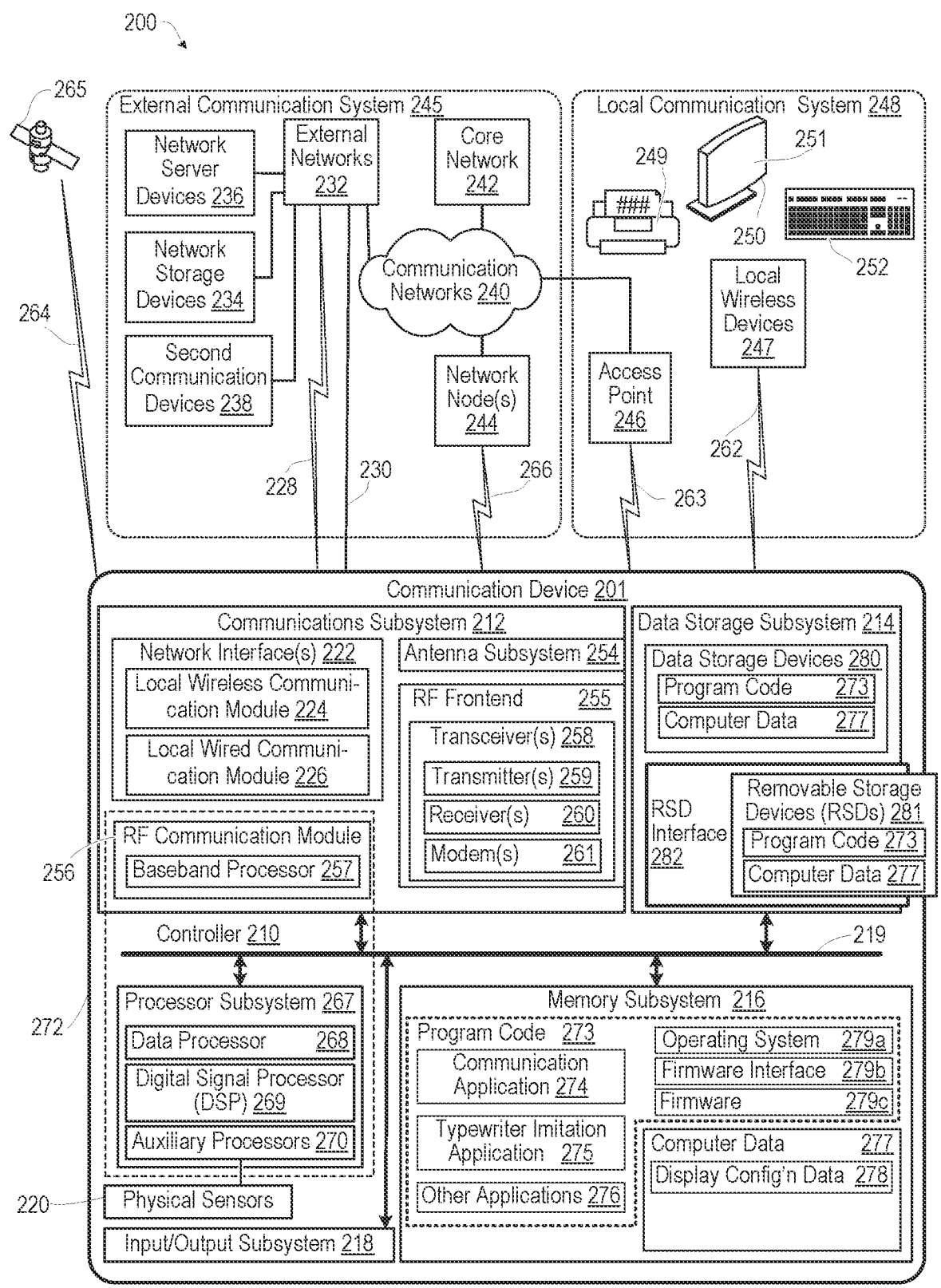
FIG. 2 depicts a functional block diagram of a communication environment including a communication device that is an implementation of the electronic device of FIG. 1, according to one or more embodiments.

FIG. 2 depicts a functional block diagram of communication environment 200 including communication device 201 that is an implementation of electronic device 101 of FIG. 1. Communication device 201 includes additional optional features to support wireless network communication. Communication device 201 can be one of a host of different types of devices, including but not limited to, a mobile cellular phone, satellite phone, or smart phone, a networked smartwatch or networked sports/exercise watch, and/or a tablet computing device or similar device that can include wireless communication functionality. As a device supporting wireless communication, communication device 201 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

Communication device 201 may include controller 210, communications subsystem 212, data storage subsystem 214, memory subsystem 216, and input/output (I/O) subsystem 218. To enable management by controller 210, system interlink 219 communicatively connects controller 210 with communications subsystem 212, data storage subsystem 214, memory subsystem 216, and I/O subsystem 218. Communication device 101 may include physical sensors 220 that are communicatively connected to controller 110, either directly or indirectly via system interlink 219. System interlink 219 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (i.e., system interlink 219) are illustrated in FIG. 2, it is to be understood that more, fewer, or different interconnections may be present in other embodiments.

In one or more embodiments, communications subsystem 212 may include one or more network interfaces 222, such as local wireless communication module 224 and local wired communication module 226, to communicatively couple communication device 201 respectively via wireless connection 228 or network cable 230 to external networks 232. Communication device 201, via external networks 232, may connect to network storage devices 234 that store computer data and to network server devices 236 that facilitate access to network storage devices 234. Network server devices 236 may have identical or similar components and functionality as described above for communication device 201. Communication device 201 may communicate with second communication devices 238 via external networks 232 or via communication networks 240 that are supported by core networks 242. Network interface(s) 222 may include a network interface controller (NIC) and support one or more network communication protocols. External networks 232 can include a local area network (LAN), a campus area network (CAN), a metropolitan area network (MAN), or a wide area network (WAN). For example, wireless connection 228 and network cable 230 can be an Ethernet connection/cable.

In one or more embodiments, communications subsystem 212 may include additional functionality for communicating, using a cellular connection, with network node(s) 244 of external communications system 245 and for communicating, using a wireless connection, with wireless access point 246 or local wireless devices 247 of local communications system 248. Examples of local wireless devices 247 may include printing device 249, external monitor 250 having extendable display 251, and wireless keyboard 252. Communications subsystem 212 includes antenna subsystem 254. Communications subsystem 212 includes radio frequency (RF) front end 255 and RF communication module 256 having baseband processor 257. RF front end 255 includes transceiver(s) 258, which includes transmitter(s) 259 and receiver(s) 260. RF front end 255 further includes modem(s) 261. Baseband processor 257 of RF communication module 256 communicates with controller 210 and RF front end 255. Baseband processor 257 operates in a baseband frequency range to encode data for transmission and decode received data, according to a communication protocol. Modem(s) 261 modulates baseband encoded data from RF communication module 256 onto a carrier signal to provide a transmit signal that is amplified by transmitter(s) 259. Modem(s) 261 demodulates each signal received using antenna subsystem 254 from external communications system 245 or local communications system 248. The received signal is amplified and filtered by receiver(s) 260, which demodulates received encoded data from a received carrier signal.

In one or more embodiments, controller 210, via communications subsystem 212, performs multiple types of cellular over-the-air (OTA) or wireless communication with local communications system 248. Communications subsystem 212 can communicate via an OTA connection 262 with local wireless devices 247. In an example, OTA connection 262 is a Bluetooth connection, or other personal access network (PAN) connection. In one or more embodiments, communications subsystem 212 communicates with one or more locally networked devices via a wireless local area network (WLAN) link 263 supported by access point 246. In one or more embodiments, access point 246 supports communication using one or more IEEE 802.11 WLAN protocols. Access point 246 is connected to communication networks 240 via a cellular or wired connection. In one or more embodiments, communications subsystem 212 receives downlink channels 264 from GPS satellites 265 to obtain geospatial location information. Communications subsystem 212 can communicate via an over-the-air (OTA) cellular connection 266 with network node(s) 244.

Controller 210 includes processor subsystem 267, which includes one or more central processing units (CPUs), depicted as data processor 268. Processor subsystem 267 can include one or more digital signal processors 269 that can be integrated with data processor 268. Processor subsystem 267 can include other processors that are communicatively coupled to data processor 268, such as baseband processors 257 of communication module 256. In another example, auxiliary processors 270 may act as a low power consumption, always-on sensor hub for physical sensors 220. In one or more embodiments that are not depicted, controller 210 can further include distributed processing and control components that are external to housing 272 or grouped with other components, such as I/O subsystem 218. Controller 210 manages, and in some instances directly controls, the various functions and/or operations of communication device 201. These functions and/or operations include, but are not limited to including, application data processing, communication with second communication devices, navigation tasks, image processing, and signal processing. In one or more alternate embodiments, communication device 201 may use hardware component equivalents for application data processing and signal processing. For example, communication device 201 may use special purpose hardware, dedicated processors, general purpose computers, microprocessor-based computers, micro-controllers, optical computers, analog computers, dedicated processors and/or dedicated hard-wired logic.

Memory subsystem 216 stores program code 273 for execution by processor subsystem 267 to provide the functionality described herein. Program code 273 includes applications such as communication application 274 and typewriter imitation application 275 that may be software or firmware that controls operation of extended display 251 to imitate operation of a typewriter as keystrokes are received by keyboard 252. Program code 273 may include other applications 276. In one or more embodiments, several of the described aspects of the present disclosure are provided via executable program code of applications executed by controller 210. In one or more embodiments, program code 273 may be integrated into a distinct chipset or hardware module as firmware that operates separately from executable program code. Portions of program code 273 may be incorporated into different hardware components that operate in a distributed or collaborative manner. Implementation of program code 273 may use any known mechanism or process for doing so using integrated hardware and/or software, as known by those skilled in the art. Program code 273 may access, use, generate, modify, store, or communicate computer data 277, such as display configuration data 278.

Computer data 277 may incorporate "data" that originated as raw, real-world "analog" information that consists of basic facts and figures. Computer data 277 includes different forms of data, such as numerical data, images, coding, notes, and financial data. Computer data 277 may originate at communication device 201 or be retrieved by communication device 201. Communication device 201 may store, modify, present, or transmit computer data 277. Computer data 277 may be organized in one of a number of different data structures. Common examples of computer data 277 include video, graphics, text, and images as discussed herein. Computer data 277 can also be in other forms of flat files, databases, and other data structures.

Memory subsystem 216 further includes operating system (OS) 279a, firmware interface 279b, such as basic input/output system (BIOS) or Uniform Extensible Firmware Interface (UEFI), and firmware 279c, which may be considered as program code 273.

Data storage subsystem 214 of communication device 201 includes data storage device(s) 280. Controller 210 is communicatively connected, via system interlink 219, to data storage device(s) 280. Data storage subsystem 214 provides program code 273 and computer data 277 stored on non-volatile storage that is accessible by controller 210. For example, data storage subsystem 214 can provide a selection of program code 273 and computer data 277. These applications can be loaded into memory subsystem 216 for execution/processing by controller 210. In one or more embodiments, data storage device(s) 280 can include hard disk drives (HDDs), optical disk drives, and/or solid-state drives (SSDs), etc. Data storage subsystem 214 of communication device 201 can include removable storage device(s) (RSD(s)) 281, which is received in RSD interface 282. Controller 210 is communicatively connected to RSD 281, via system interlink 219 and RSD interface 282. In one or more embodiments, RSD 281 is a non-transitory computer program product or computer readable storage device. Controller 210 can access data storage device(s) 280 or RSD 281 to provision communication device 201 with program code 273.

Figure 3:
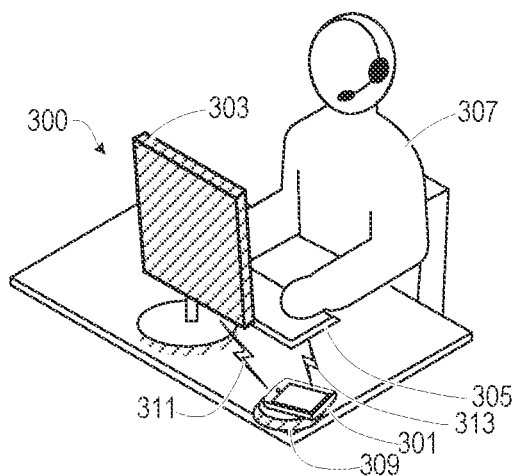
FIG. 3 depicts a three-dimensional view of an example electronic system for imitating a typewriter that includes the communication device, an extendable display in a retracted position, and a keyboard with a user positioned at the keyboard, according to one or more embodiments.
Figure 4:
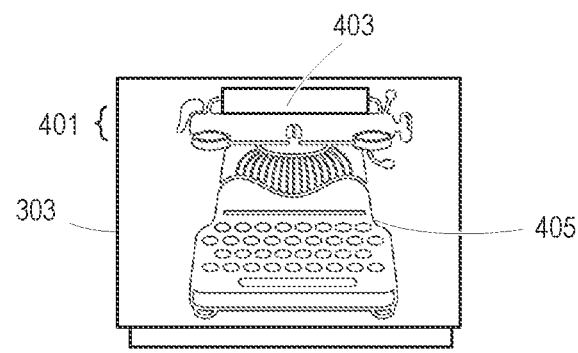
FIG. 4 depicts a front view of the extendable display of FIG. 3 in a retracted position presenting an initial position of a virtual typing sheet, according to one or more embodiments.

FIG. 3 depicts a three-dimensional view of an example electronic system 300 for imitating a typewriter that includes communication device 301, extendable display 303 in a retracted position, and keyboard 305 with user 307 positioned at keyboard 305. Communication device 301 is an example of electronic device 101 (FIG. 1) and communication device 201 (FIG. 2). Communication device 301 may be placed in or on dock 309 for receiving power and access to communication channels. Communication device 301 is communicatively coupled to extendable display 303 and keyboard 305, such as via respective wireless links 311 and 313. FIG. 4 depicts a front view of extended display 303 of FIG. 3 in a retracted position presenting initial position 401 of virtual typing sheet 403 that is clear of characters. Typewriter image 405 of a mechanical typewriter is presented below virtual typing sheet 403 to enhance an illusion of typewriter operation. Virtual typing sheet 403 may appear to be spooled upwardly from typewriter image 405. Vertical dimensions of virtual typing sheet 403 are limited to physical limitations of extendable display 303 to extend. Vertical dimensions of virtual typing sheet 403 may be further constrained by a software limit, such as to correspond to a traditional size of a sheet of typing paper.

Figure 5:
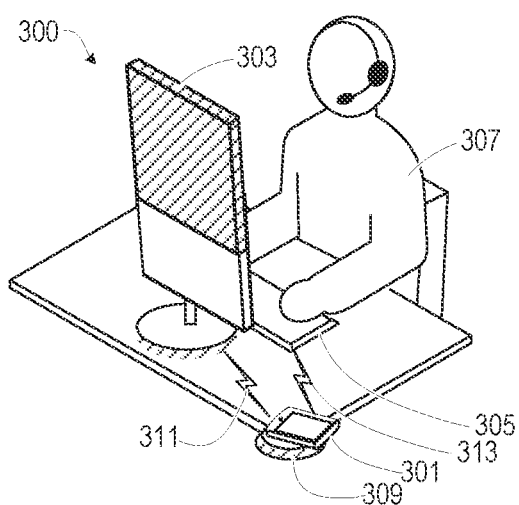
FIG. 5 depicts a three-dimensional view of the example electronic system of FIG. 3 having the extendable display in an at least partially extended position, according to one or more embodiments.
Figure 6:
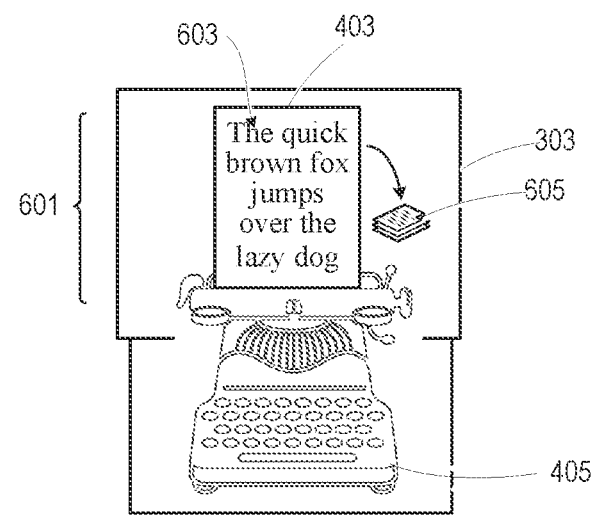
FIG. 6 depicts a front view of the extendable display of FIG. 5 in the at least partially extended position presenting the virtual typing sheet having the characters inputted as keystrokes on the keyboard, presented on an extended upper portion of the display, according to one or more embodiments.

FIG. 5 depicts a three-dimensional view of electronic system 300 of FIG. 3 having extendable display 303 in an at least partially extended position. User 307 is entering keystrokes at keyboard 305. FIG. 6 depicts a front view of extendable display 303 of FIG. 5 in the at least partially extended position presenting full position 601 of virtual typing sheet 403 having the characters 603, which are based on keystrokes by user 307 (FIG. 5). In an example, keys and print arms of typewriter image 405 may animate to correspond to keystrokes detected at keyboard 305 (FIG. 5). Indication 605 is presented of storing completed typing sheets in response to completing virtual typing sheet 403.

Figure 7A:
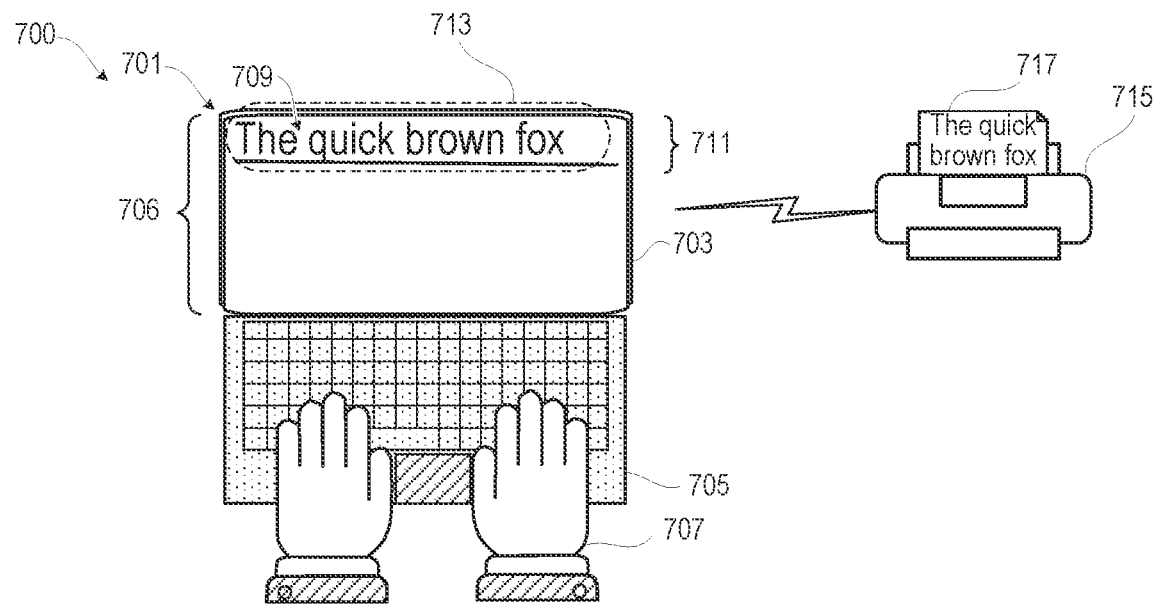
FIG. 7A depicts a front view of an example system implemented as an electronic device in a laptop design form having an extendable display in a retracted position and that communicates with a printing device, according to one or more embodiments.
Figure 7B:
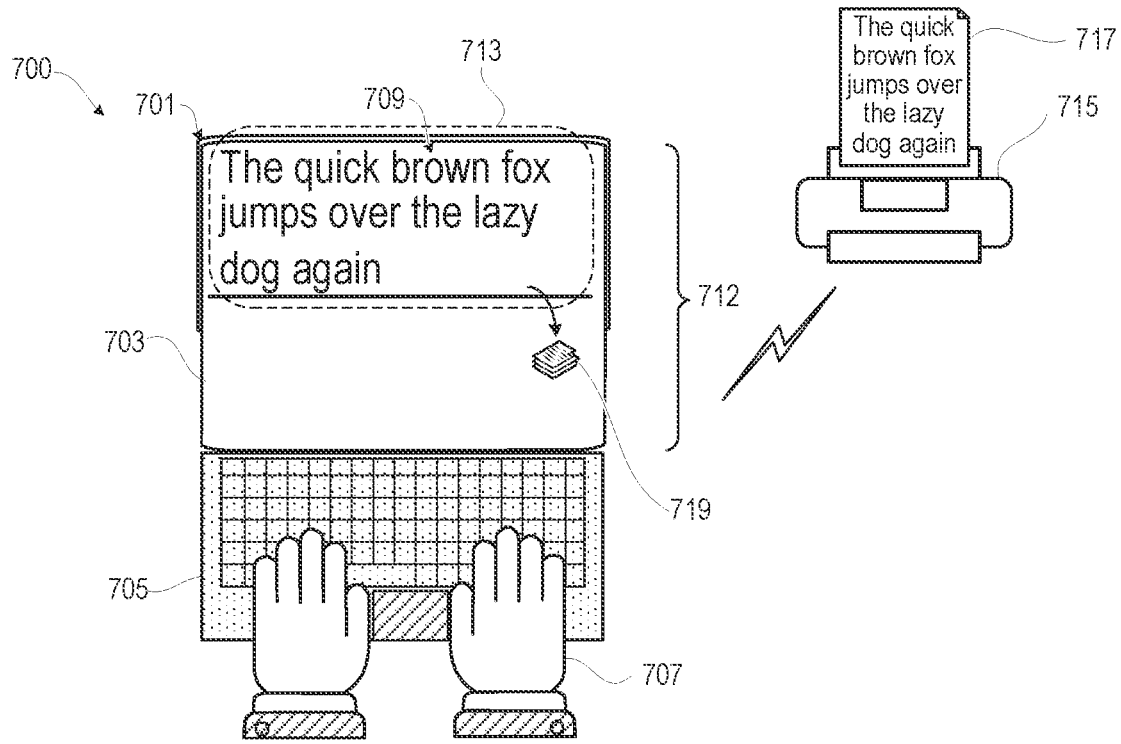
FIG. 7B depicts a front view of the example system of FIG. 7A with the extendable display in an at least partially extended position, according to one or more embodiments.

FIG. 7A depicts a front view of electronic system 700 for imitating a typewriter being implemented in electronic device 701 in a laptop design form with integral extendable display 703 and integral keyboard 705. Extendable display 703 is in retracted position 706. In response to keystrokes by user 707 on keyboard 705, corresponding characters 709 are entered on top row 711 of virtual typing sheet 713. In one or more embodiments, electronic device 701 is communicatively coupled to printer device 715 and the characters are transmitted to printer to produce a physical typing sheet 717. Depending on capabilities of printer device 715, characters 709 may be printed character-by-character, line-by-line, or page-by-page as virtual typing sheet 713 is completed. FIG. 7B depicts a front view of electronic device 701 with extendable display 703 in at least partially extended position 712. When entry of characters on virtual typing sheet 713 is complete, indication 719 is presented of storing virtual typing sheet 713, and printing of physical typing sheet 717 is completed.

Figures 8A, 8B:
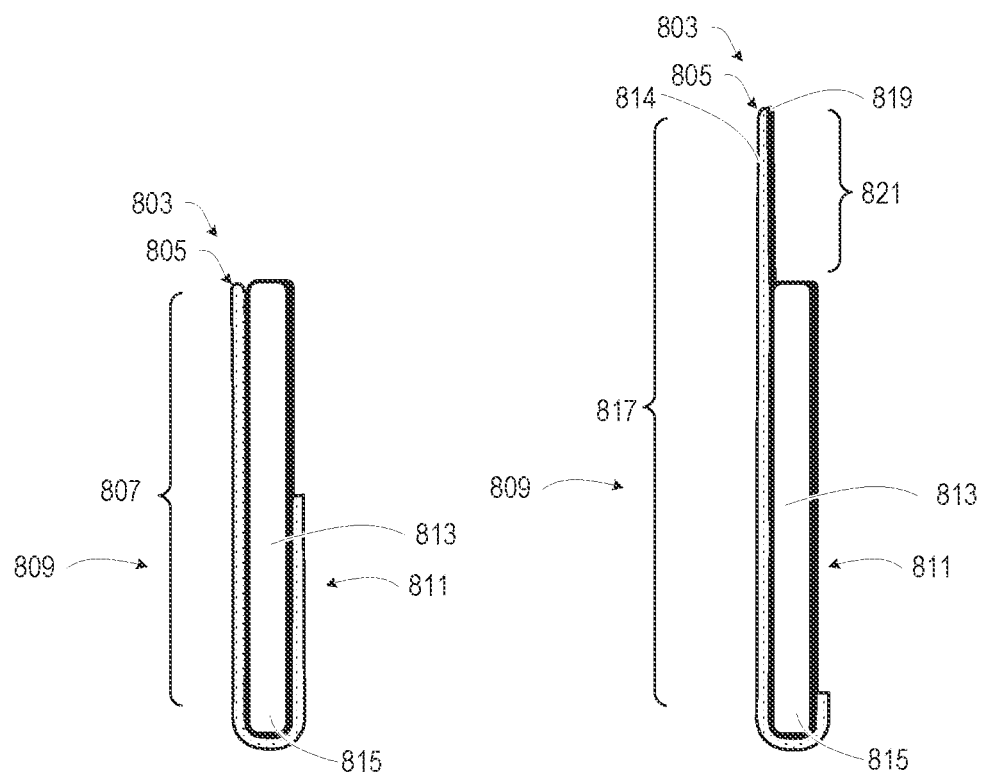
FIG. 8A depicts a side view of an example extendable display implemented as a blade assembly in a retracted position on both a front side and back side a device housing, according to one or more embodiments.
FIG. 8B depicts a side view of the extendable display of FIG. 8A with the blade assembly in an extended position rolled onto and extending beyond the front side of the device housing, according to one or more embodiments.

FIG. 8A depicts a side view of extendable display 803 that is a rollable display, implemented with blade assembly 805 in retracted position 807 and received on both front side 809 and back side 811 of device housing 813. Blade assembly 805 includes flexible display 814 that rolls across bottom edge 815. FIG. 8B depicts a side view of extendable display 803 of FIG. 8A with blade assembly 805 in extended position 817 rolled onto and extending beyond a top edge of front side 809 of device housing. Blade substrate 819 supports flexible display 814 and is rigid in portions that do not roll across bottom edge 815 such supporting distally extending portion 821.

Figure 9:
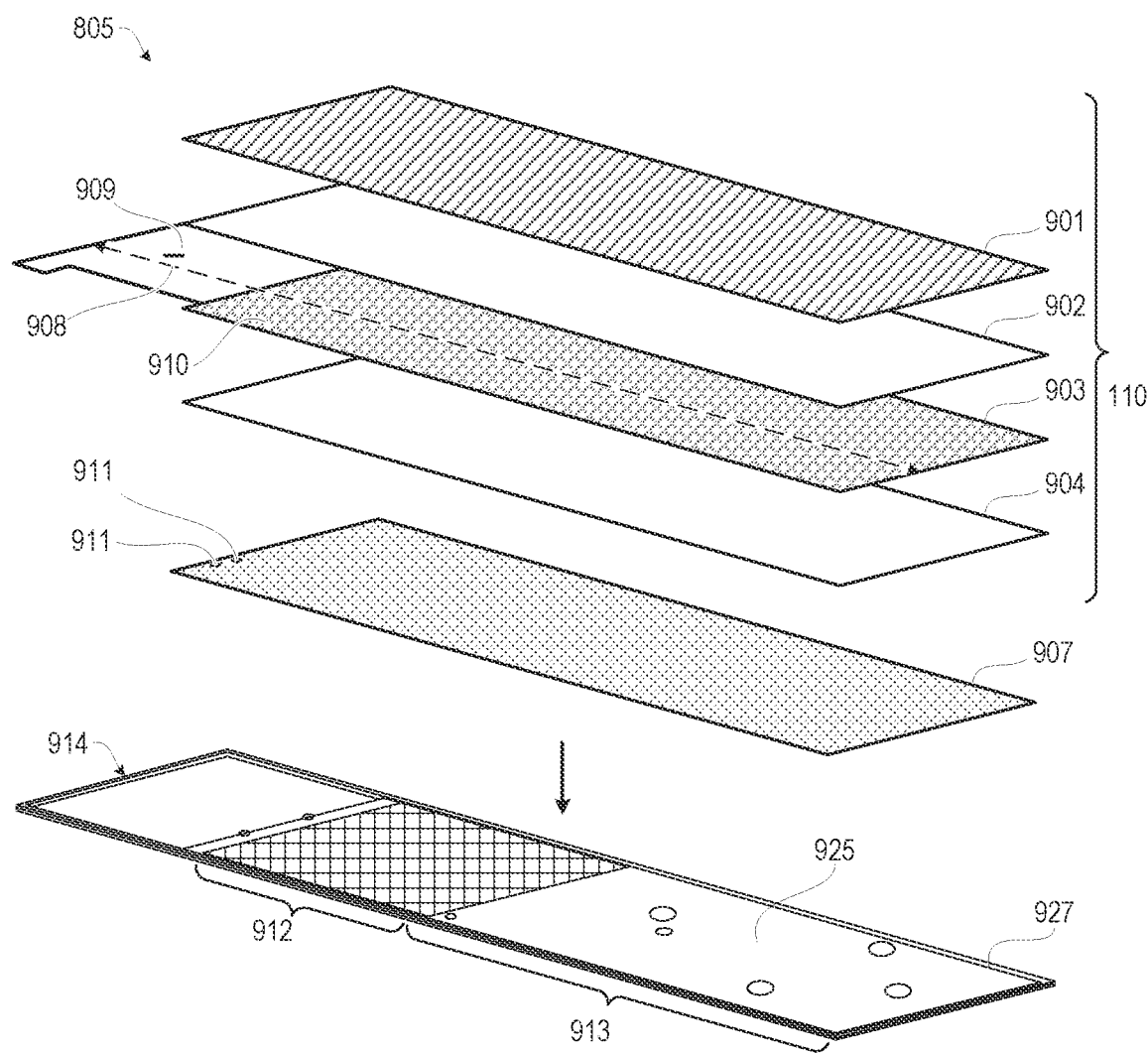
FIG. 9 depicts an exploded view of the blade assembly of FIGS. 8A-8B, according to one or more embodiments.

FIG. 9 depicts an exploded view of blade assembly 805 of FIGS. 8A-8B including flexible display 814 and blade substrate 819. In one or more embodiments, flexible display 814 includes one or more layers that are coupled or laminated together to complete flexible display 814. In an example, flexible display 814 includes flexible protective cover 901, first adhesive layer 902, flexible display layer 903, second adhesive layer 904, and flexible substrate 907. Beginning from the top of the layer stack opposite to blade 914, in one or more embodiments, flexible protective cover 901 includes an optically transparent substrate such as a thin film sheet of a thermoplastic material. In an example, flexible protective cover 901 is manufactured from a layer of optically transparent polyamide or polycarbonate having a thickness of about eighty microns. Flexible protective cover 901 may function as a fascia by defining a cover for flexible display layer 903. In one or more embodiments, flexible protective cover 901 is optically transparent, in that light can pass through the flexible protective cover 901 so that objects behind flexible protective cover 901 can be distinctly seen. Flexible protective cover 901 may optionally include an ultraviolet barrier. Such a barrier can be useful in improving the visibility of flexible display layer 903.

Beneath flexible protective cover 901 is first adhesive layer 902. In one or more embodiments, first adhesive layer 902 is an optically transparent adhesive. The optically transparent adhesive can be applied to two sides of a thin, optically transparent substrate such that the first adhesive layer 902 functions as an optically transparent layer having optically transparent adhesive on both sides. Where so configured as "double-sided tape", first adhesive layer 902 may have a thickness of about fifty microns that can then be spooled and applied between, to couple together, flexible protective cover 901 and flexible display layer 903. In other embodiments, first adhesive layer 902 may be applied between flexible protective cover 901 and the display layer 903 as an optically transparent liquid or gel that is allowed to cure or optionally cured by heat, ultraviolet light, or other techniques. First adhesive layer 902 mechanically couples flexible display layer 903 to flexible protective cover 901.

In one or more embodiments, flexible display layer 903 includes image producing portion 909 having a same length and width, and aligned with, flexible protective cover 901 and flexible substrate 907. In one or more embodiments, flexible display layer 903 includes T-shaped tongue 910 attached along major axis 908 of flexible display layer 903. Blade 914 is sized to receive flexible display layer 903 attached to T-shaped tongue 910. In one or more embodiments, electronic circuit components configured to operate image producing portion 909 of the flexible display layer 903, connectors, and other components can be coupled to this T-shaped tongue 910 and further coupled to image producing portion 909 of flexible display 814. For instance, as shown in FIG. 9, flexible display layer 903 includes a T-shaped tongue 910 that extends beyond image producing portion 909 of flexible display layer 903 and other layers (901, 902, 904, and 907) of flexible display 814. While T-shaped tongue 910 is T-shaped in this illustrative embodiment, T-shaped tongue 910 can take other shapes.

Flexible display layer 903 optionally may be touch-sensitive. In one or more embodiments, flexible display layer 903 is an organic light emitting diode (OLED) display layer. Flexible display layer 903 can bend in accordance with various bending radii. For example, some embodiments allow bending radii of between thirty and six hundred millimeters. Other substrates allow bending radii of around five millimeters to provide a display that is foldable through active bending. Other configurations of flexible display 814 may accommodate both bends and folds. In one or more embodiments, flexible display layer 903 may be formed from multiple layers of flexible material such as flexible sheets of polymer or other materials. Flexible display layer 903 may include a layer of optically pellucid electrical conductors, a polarizer layer, one or more optically transparent substrates, and layers of electronic control circuitry such as thin film transistors to actuate pixels and one or more capacitors for energy storage. In one or more embodiments, flexible display layer 903 has a thickness of about 130 microns.

In one or more embodiments, to be touch sensitive, flexible display layer 903 includes a layer including one or more optically transparent electrodes. In one or more embodiments, flexible display layer 903 includes an organic light emitting diode layer configured to present images and other information to user 106 (FIG. 1). The organic light emitting diode layer can include one or more pixel structures arranged in an array, with each pixel structure including a plurality of electroluminescent elements, such as organic light emitting diodes. These various layers can be coupled to one or more optically transparent substrates of flexible display layer 903. In one or more embodiments, flexible substrate 907 includes a thin layer of steel having a thickness of about thirty microns. In one or more embodiments, flexible substrate 907 includes a thin layer of thermoplastic material.

In other embodiments, a layer (901-902) above flexible display layer 903 may be configured with enough stiffness to make the flexible substrate 907 unnecessary. In an example, flexible protective cover 901 is configured with enough stiffness to provide sufficient protection for flexible display 814 during bending, enabling flexible substrate 907 to be omitted.

Flexible display 814 is supported by flexible substrate 907 and by blade 914 having blade substrate 925. In one or more embodiments, blade substrate 925 includes a layer of steel.

In one or more embodiments, blade substrate 925 is thicker than flexible substrate 907. In an example, flexible substrate 907 includes a steel layer with a thickness of about thirty microns and blade substrate 925 includes a layer of steel having a thickness of about one hundred microns. In one or more embodiments, blade substrate 925 is a rigid, substantially planar support layer. In an example, blade substrate 925 may be manufactured from stainless steel, from a thin, rigid thermoplastic sheet, or from nitinol material, which is a nickel-titanium alloy.

In one or more embodiments, the flexible substrate 907 is slightly longer along a major axis of the flexible substrate 907 than is the image producing portion 909 of the flexible display 814. Since the T-shaped tongue 910 is T-shaped, this allows one or more apertures 911 to be exposed on either side of the base of the T of the T-shaped tongue 910. As will be described in more detail below, this extra length along the major axis provided by the flexible substrate 907 allows one or more fasteners to rigidly couple the first end of the flexible substrate 907 to a tensioner.

Embodiments of the disclosure contemplate that some of the layers comprising the flexible display 814 are stiffer than others. Similarly, other layers of the flexible display 814 are softer than others. For example, where the flexible substrate 907 is manufactured from a metal, one example of which is stainless steel, this layer is stiffer than the first adhesive layer 902. In one or more embodiments, the stainless steel is stiffer than the flexible display layer 903 as well. In one or more embodiments, the flexible substrate 907 is the stiffest layer in the flexible display 814, while the first adhesive layer is the softest layers of the flexible display 814. The flexible protective cover 901 and the flexible display layer 903 have a stiffness that falls between that of the flexible substrate 907 and the adhesive layers in one or more embodiments.

In one or more embodiments, the various layers of the flexible display 814 are laminated together in a substantially planar configuration. Said differently, in one or more embodiments the flexible substrate 907 is configured as a substantially planar substrate. The first adhesive layer 902 can be attached to the flexible display layer 903, with the flexible protective cover 901 attached to the first adhesive layer 902. To ensure proper coupling, flexible display layer 903 can be cured, such as in an autoclave at a predefined temperature for a predefined duration. Where employed, such curing allows any air bubbles or other imperfections in the various layers to be corrected. In one or more embodiments, flexible substrate 907 is configured as a substantially planar substrate resulting in flexible display 814 being substantially planar.

In one or more embodiments, blade substrate 925 of blade 914 includes both flexible portion 912 and rigid portion 913. Flexible portion 912 is positioned to encounter bending in translation of blade assembly 805 from the retracted position to the extended position. Rigid portion 913 is positioned to remain on front side 809 of device housing 813 (FIG. 8B) during translation. In the extended position, rigid portion 913 extends beyond front side 809 of device housing 813 (FIG. 8B). In an example, blade substrate 925 is manufactured from a metal such as steel having a thickness of one hundred microns that provides rigidity to rigid portion 913.

In one or more embodiments, blade 914 includes silicone border 927 positioned around a perimeter of blade substrate 925 to protect the edges of flexible display 814 when attached to blade substrate 925 of blade 914. In one or more embodiments, silicone border 927 is co-molded around the perimeter of blade substrate 925.

In one or more embodiments, rigid portion 913 of blade substrate 925 can define one or more apertures. These apertures can be used for a variety of purposes. In an example, some of the apertures can be used to rigidly fasten blade 914 to a translation mechanism, such as a display roller mechanism. Additionally, some of the apertures can contain magnets. Hall-effect sensors positioned in device housing 813 (FIG. 8B) to which blade assembly 805 is coupled can then detect the positions of these magnets such that controller 110 (FIG. 1) can determine whether blade assembly 805 including flexible display 814 are in the extended position, the retracted position, the peek position, or an intermediate position.

In one or more embodiments, flexible display 814 is coupled to blade substrate 925 of blade 914 within the confines of silicone border 927. In an example, a first end of flexible display 814 is adhesively coupled to rigid portion 913 of blade substrate 925 of blade 914. The other end of flexible display 814 may be rigidly coupled to a tensioner by passing fasteners through apertures 911 of flexible substrate 907.

Figure 10A:
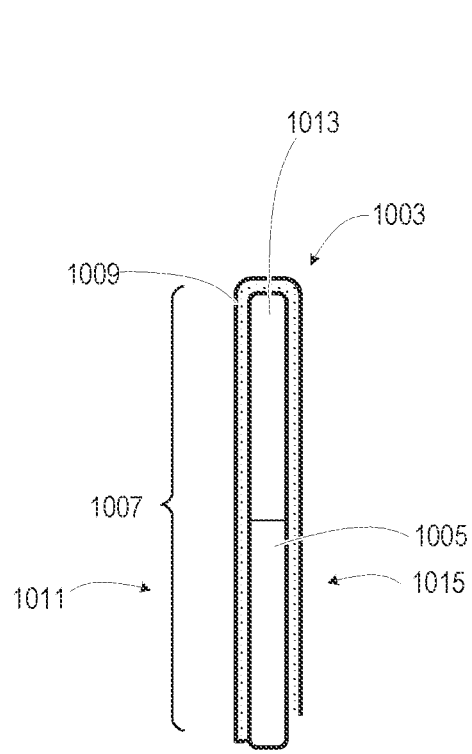
FIG. 10A depicts a side view of another example extendable display having a telescoping device housing in a retracted position and with an excess portion of a flexible display not needed to cover a front side rolled onto a back side of the device housing, according to one or more embodiments.
Figure 10B:
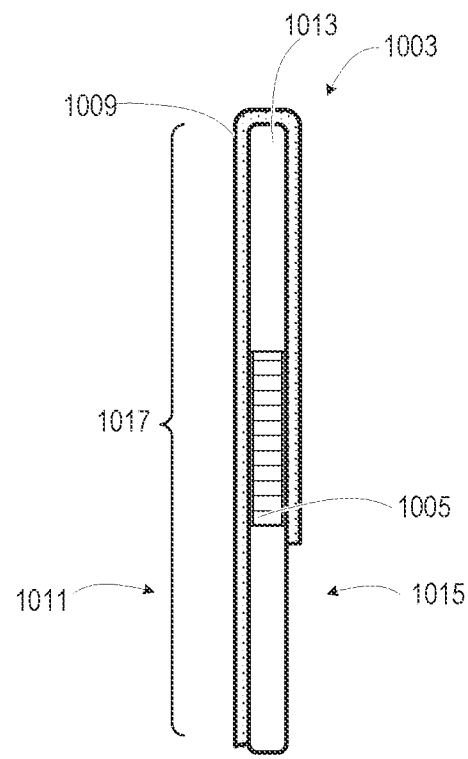
FIG. 10B depicts a side view of the extendable display of FIG. 10A in an at least partially extended position, according to one or more embodiments.

FIG. 10A depicts a side view of extendable display 1003 having telescoping device housing 1005 in retracted position 1007 and with an excess portion of flexible display 1009 not needed to cover front side 1011 rolled over top edge 1013 onto back side 1015 of device housing 1005. FIG. 10B depicts a side view of extendable display 1003 of FIG. 10A in at least partially extended position 1017 that rolls some of flexible display 1009 from back side 1015 to front side 1011 of device housing 1005.

Figure 11A:
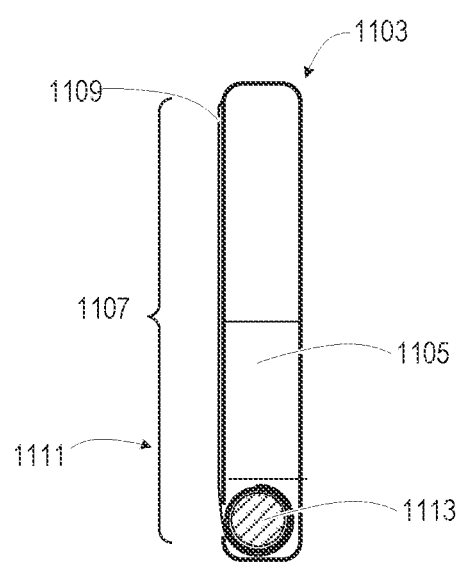
FIG. 11A depicts a side view of an additional example extendable display having a telescoping device housing in a retracted position and with an excess portion of a flexible display not needed to cover a front side scrolled within the device housing, according to one or more embodiments.
Figure 11B:
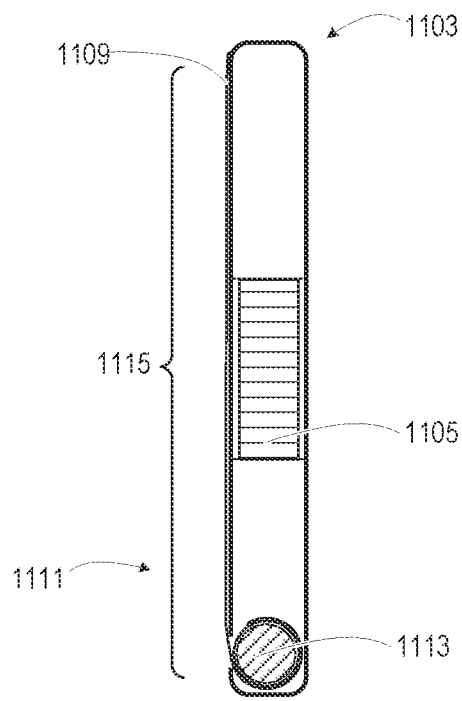
FIG. 11B depicts a side view of the extendable display of FIG. 11A in an at least partially extended position, according to one or more embodiments.

FIG. 11A depicts a side view of extendable display 1103 having telescoping device housing 1105 in retracted position 1107 and with an excess portion of flexible display 1109 not needed to cover front side 1111 scrolled within device housing 1105 in spool 1113. FIG. 11B depicts a side view of extendable display 1103 of FIG. 11A in at least partially extended position 1115, which draws some of flexible display 1109 from spool 1113.

Figure 12A:
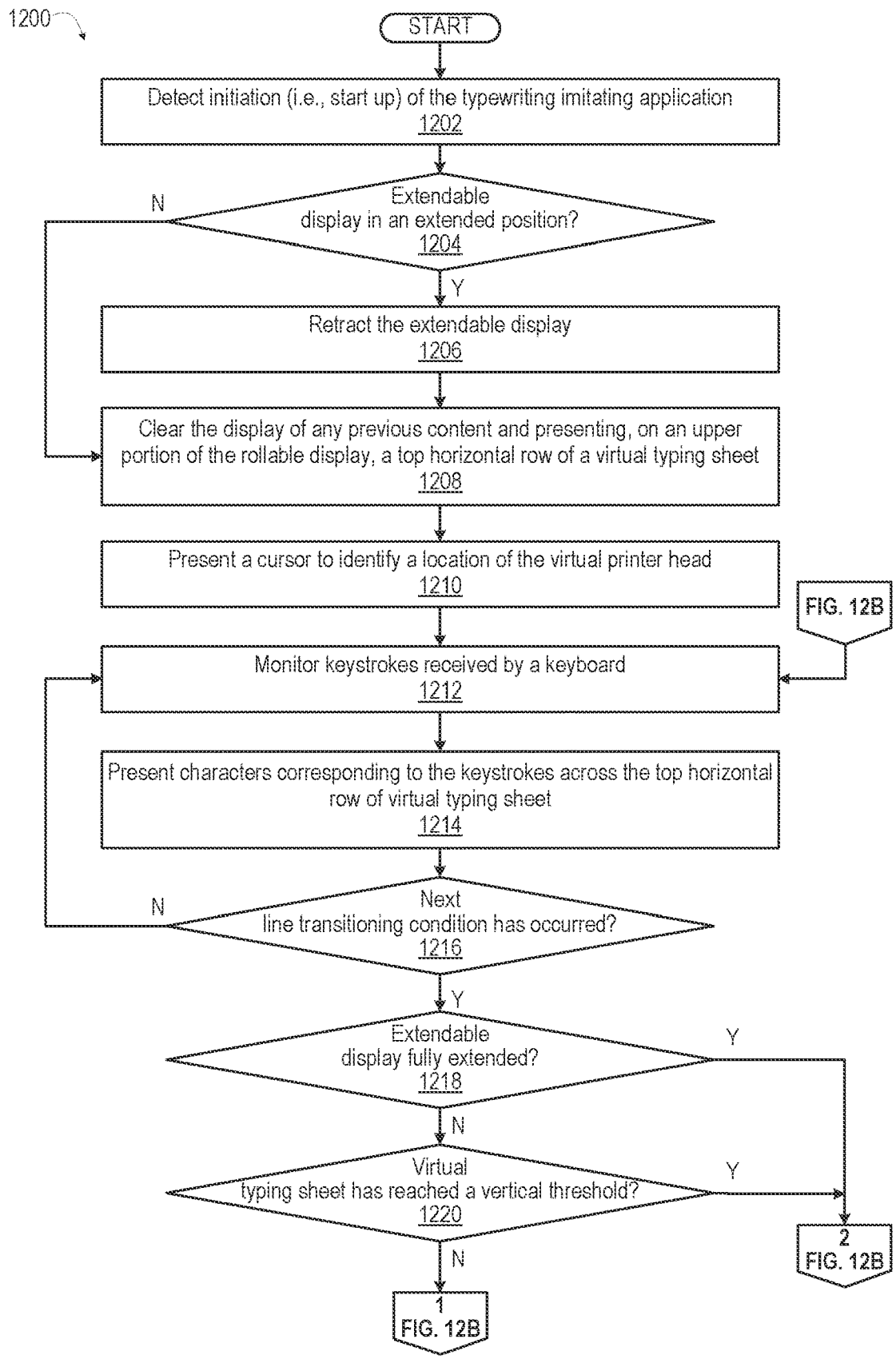
FIGS. 12A-12B (collectively "FIG. 12") are a flow diagram of a method of imitating operation of a typewriter by an electronic system having an extendable display and a text input device, according to one or more embodiments.
Figure 12B:
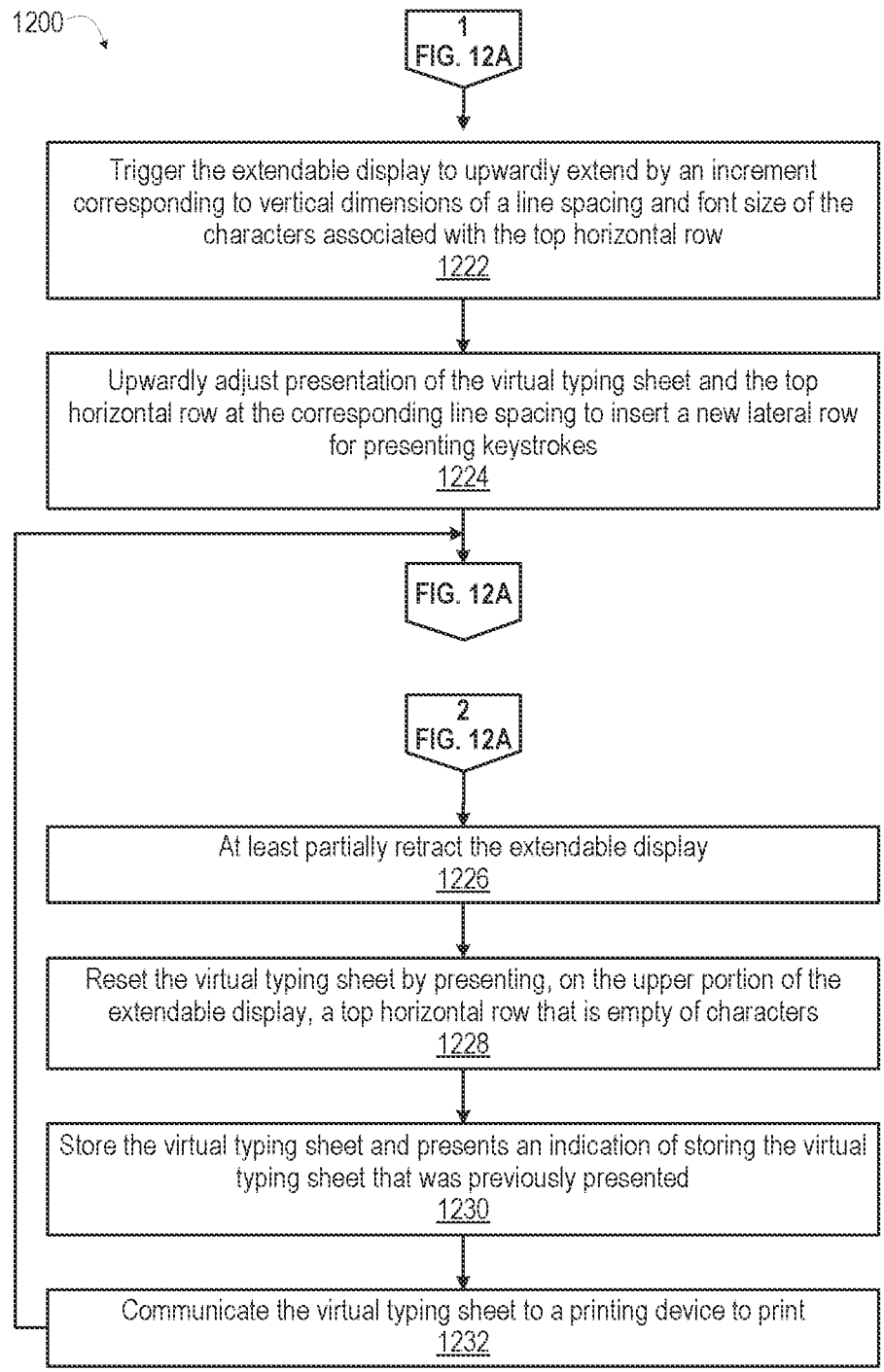

FIGS. 12A-12B (collectively "FIG. 12") are a flow diagram of a method of imitating operation of a typewriter by an electronic system that includes an extendable display and a text input device. The description of method 1200 (FIG. 12) is provided with general reference to the specific components illustrated within the preceding FIGS. 1-6, 7A-7B, 8A-8B, 9, 10A-10B, and 11A-11B. Specific components referenced in method 1200 may be identical or similar to components of the same name used in describing preceding FIGS. FIGS. 1-6, 7A-7B, 8A-8B, 9, 10A-10B, and 11A-11B. In one or more embodiments, controller 110 (FIG. 1) and controller 210 (FIG. 2) respectively configure electronic device 101 (FIG. 1) and communication device 201 (FIG. 2) to provide the described functionality of method 1200 (FIG. 12).

With reference to FIG. 12A, method 1200 includes detecting initiation (i.e., startup) of the typewriting imitating application (block 1202). Method 1200 includes determining whether the extendable display is in an extended position (decision block 1204). In response to determining that the extendable display is in an extended position, method 1200 includes retracting the extendable display (block 1206). in response to determining that the extendable display is not in the extended position in decision block 1204 or after block 1206, method 1200 includes clearing the display of any previous content and presenting, on an upper portion of the rollable display, a top horizontal row of a virtual typing sheet (block 1208). In one or more embodiments, method 1200 can include presenting a cursor to identify a location of the virtual printer head (block 1210). Method 1200 includes monitoring keystrokes received by a keyboard (block 1212). Method 1200 includes presenting characters corresponding to the keystrokes across the top horizontal row of virtual typing sheet (block 1214). Method 1200 includes determining whether a next line transitioning condition has occurred (decision block 1216). In an example, a next line transitioning condition has occurred when a last character reaches an end of a current row of the virtual typing sheet. In another example, a next line transitioning condition has occurred when a return keystroke received via the keyboard is detected. In response to determining that the next line transitioning condition has not occurred, method 1200 returns to block 1212. In response to an occurrence of a next line transitioning condition in decision block 1216, method 1200 includes determining whether the extendable display is fully extended (i.e., a hardware limit) (decision block 1218). In response to determining that the extendable display is fully extended, method 1200 proceeds block 1226 (FIG. 12B). In response to determining that the extendable display is not fully extended, method 1200 includes determining whether the virtual typing sheet has reached a vertical threshold (i.e., a software limit) (decision block 1220). The vertical threshold may be based on avoiding presentation of an unrealistically narrow vertical aspect ratio of the virtual typing sheet that does not appear to match a letter or A4 format of physical typing paper. In response to determining that the vertical threshold has been reached, method 1200 proceeds to block 1226 (FIG. 12B). In response to determining that the vertical threshold has not been reached, method 1200 proceeds to block 1222 of FIG. 12B.

With reference to FIG. 12B, method 1200 includes triggering the extendable display to upwardly extend by an increment corresponding to vertical dimensions of a line spacing and font size of the characters associated with the top horizontal row (block 1222). Method 1200 includes upwardly adjusting presentation of the virtual typing sheet and the top horizontal row at the corresponding line spacing to insert a new lateral row for presenting keystrokes (block 1224). Then method 1200 returns to block 1212 (FIG. 12A). In response to determining that the extendable display is fully extended in decision block 1218 or has reached the vertical threshold in decision block 1220, method 1200 includes at least partially retracting the extendable display (block 1226). Method 1200 includes resetting the virtual typing sheet by presenting, on the upper portion of the extendable display, a top horizontal row that is empty of characters (block 1228). In one or more embodiments, method 1200 includes storing the virtual typing sheet and presents an indication of storing the virtual typing sheet that was previously presented (block 1230). Method 1200 includes communicating the virtual typing sheet to a printing device to print (block 1232). Then method 1200 returns to block 1212 (FIG. 12A).

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising." when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
a memory storing a typewriter imitation application; and
a controller communicatively connected to a text input device, an extendable display, and the memory, and which:
executes the typewriter imitation application, which presents, on an upper portion of the extendable display, a top horizontal row of a virtual typing sheet;
monitors keystrokes received by the text input device;
presents characters corresponding to the keystrokes across the top horizontal row of virtual typing sheet; and in response to an occurrence of a next line transitioning condition from among a last character reaching an end of a current row of the virtual typing sheet and detection of a return keystroke received via the text input device:
triggers the extendable display to upwardly extend by an increment corresponding to vertical dimensions of a line spacing and font size of the characters associated with the top horizontal row; and
upwardly adjusts presentation of the virtual typing sheet and the top horizontal row at the corresponding line spacing to insert a new lateral row for presenting keystrokes.

2. The electronic device of claim 1, wherein the text input device comprises a keyboard.

3. The electronic device of claim 2, further comprising the text input device that comprises an integrated keyboard, wherein the extendable display and the integrated keyboard are configured with a laptop design form.

4. The electronic device of claim 1, wherein the text input device comprises:
a microphone; and
a dictation system communicatively coupled to the microphone to convert words and symbols recognized in an audio input to the microphone into the keystrokes and corresponding text.

5. The electronic device of claim 1, wherein the extendable display comprises a rollable display comprising:
a telescoping frame configured to vertically translate between a fully retracted position and a fully extended position;
a flexible display extended across the telescoping frame;
a rollable display mechanism that rolls an excess portion of the flexible display away from a front side of the telescoping frame; and
a translation mechanism that positions the telescoping frame at a plurality of extended positions from the fully retracted to the fully extended positions.

6. The electronic device of claim 5, wherein the rollable display mechanism rolls the excess portion of the flexible display onto a back side of the telescoping frame as the flexible display is being retracted.

7. The electronic device of claim 5, wherein the rollable display mechanism rolls the excess portion of the flexible display into a scrolled portion contained with the telescoping frame as the flexible display is being retracted.

8. The electronic device of claim 1, wherein, in response to the occurrence of the next line transitioning condition, the controller:
determines whether the extendable display is fully extended; and
in response to determining that the extendable display is fully extended:
at least partially retracts the extendable display; and
resets the virtual typing sheet by presenting, on the upper portion of the extendable display, a top horizontal row that is empty of characters.

9. The electronic device of claim 1, wherein, in response to the occurrence of the next line transitioning condition, the controller:
in response to determining that the virtual typing sheet has reached a vertical threshold:
at least partially retracts the extendable display; and
presents, on the upper portion of the extendable display, a top horizontal row of a reset virtual typing sheet that is empty of characters.

10. The electronic device of claim 1, wherein, in response to determining at least one of that the extendable display is fully extended or the virtual typing sheet has reached a vertical threshold, the controller stores the virtual typing sheet and presents an indication of storing the virtual typing sheet that was previously presented.

11. The electronic device of claim 1, further comprising a communications subsystem communicatively connectable to a printing device, wherein the controller communicates the virtual typing sheet, via the communications subsystem, to the printing device to print in response to determining that the virtual typing sheet is complete based on at least one of: (i) identifying a new page input; (ii) determining that the extendable display is fully extended; and (iii) determining that the virtual typing sheet has reached a vertical threshold.

12. The electronic device of claim 1, further comprising a communications subsystem communicatively coupled to the controller, and wherein the controller:
communicatively connects to an external input device comprising the text input device that comprises an external keyboard to monitor the keystrokes; and
communicatively connects to an external display device comprising the extendable display to present the characters corresponding to the keystrokes and to trigger extension by the extendable display.

13. A method comprising:
presenting, on an upper portion of an extendable display, a top horizontal row of a virtual typing sheet;
monitoring keystrokes received by a text input device;
presenting characters corresponding to the keystrokes across the top horizontal row of virtual typing sheet; and
in response to an occurrence of a next line transitioning condition from among a last character reaching an end of a current row of the virtual typing sheet and detection of a return keystroke received via the text input device:
triggering the extendable display to upwardly extend by an increment corresponding to vertical dimensions of a line spacing and font size of the characters associated with the top horizontal row; and
upwardly adjusting presentation of the virtual typing sheet and the top horizontal row at the corresponding line spacing to insert a new lateral row for presenting keystrokes.

14. The method of claim 13, wherein monitoring keystrokes received by the text input device the text input device comprises:
monitoring a microphone; and
converting words and symbols, recognized by a dictation system, in an audio input to the microphone into the keystrokes and corresponding text.

15. The method of claim 13, wherein the extendable display comprises a rollable display comprising:
a telescoping frame configured to vertically translate between a fully retracted position and a fully extended position;
a flexible display extended across the telescoping frame;
a rollable display mechanism that rolls an excess portion of the flexible display away from a front side of the telescoping frame; and
a translation mechanism that positions the telescoping frame at a plurality of extended positions from the fully retracted to the fully extended positions.

16. The method of claim 13, wherein, in response to the occurrence of the next line transitioning condition, the method further comprises:

determining whether the extendable display is fully extended; and in response to determining that the extendable display is fully extended:

at least partially retracting the extendable display; and resetting the virtual typing sheet by presenting, on the upper portion of the extendable display, a top horizontal row that is empty of characters.

17. The method of claim 13, wherein, in response to the occurrence of the next line transitioning condition, the method further comprises:

in response to determining that the virtual typing sheet has reached a vertical threshold:

at least partially retracting the extendable display; and presenting, on the upper portion of the extendable display, a top horizontal row of a reset virtual typing sheet that is empty of characters.

18. The method of claim 13, wherein, in response to determining at least one of that the extendable display is fully extended or the virtual typing sheet has reached a vertical threshold, the method further comprises storing the virtual typing sheet and presents an indication of storing the virtual typing sheet that was previously presented.

19. The method of claim 13, further comprising communicating the virtual typing sheet to a printing device to print in response to determining that the virtual typing sheet is complete based on at least one of: (i) identifying a new page input; (ii) determining that the extendable display is fully extended; and (iii) determining that the virtual typing sheet has reached a vertical threshold.

20. A computer program product comprising:

a computer readable storage device; and program code on the computer readable storage device that when executed by a processor associated with an electronic device, the program code enables the electronic device to provide functionality of:

presenting, on an upper portion of an extendable display, a top horizontal row of a virtual typing sheet;

monitoring keystrokes received by a text input device;

presenting characters corresponding to the keystrokes across the top horizontal row of virtual typing sheet; and in response to an occurrence of a next line transitioning condition from among a last character reaching an end of a current row of the virtual typing sheet and detection of a return keystroke received via the text input device:

triggering the extendable display to upwardly extend by an increment corresponding to vertical dimensions of a line spacing and font size of the characters associated with the top horizontal row; and upwardly adjusting presentation of the virtual typing sheet and the top horizontal row at the corresponding line spacing to insert a new lateral row for presenting keystrokes.

* * * * *